United States Patent [19]
Hopengarten

[11] 3,838,332
[45] Sept. 24, 1974

[54] LINE CONNECTED SCR REGULATOR

[75] Inventor: Albert Hopengarten, Lafayette Hill, Pa.

[73] Assignee: Philco-Ford Corportion, Blue Bell, Pa.

[22] Filed: July 30, 1973

[21] Appl. No.: 384,116

[52] U.S. Cl. ........ 321/18, 178/DIG. 11, 323/22 SC, 323/34
[51] Int. Cl. .............................................. G05f 1/56
[58] Field of Search .................... 307/252 N; 321/18; 323/22 SC, 34

[56] References Cited
UNITED STATES PATENTS

| | | | |
|---|---|---|---|
| 3,501,771 | 3/1970 | Miller et al. | 323/34 X |
| 3,510,686 | 5/1970 | Zug | 307/252 N |
| 3,601,688 | 8/1971 | Dogadko et al. | 323/22 SC |
| 3,766,463 | 10/1973 | Ruben | 323/22 SC |

*Primary Examiner*—A. D. Pellinen
*Attorney, Agent, or Firm*—Gail W. Woodward; Robert D. Sanborn

[57] ABSTRACT

A line connected d-c power supply uses an SCR to act as a rectifier and to provide regulation for power line and load variations. The SCR is fired by means of a pulse that is delayed by a suitable value with respect to the a-c input. The delay is such that the SCR fires in the interval of shortly ahead of the input peak to a point before the zero crossing. The SCR firing angle is varied so as to keep the rectified d-c output voltage constant. A Miller integrator circuit is used to provide the delay function and a bistable latching circuit is used to generate the SCR firing pulse. The delay period is made a function of the difference between the d-c output voltage and a reference voltage.

6 Claims, 5 Drawing Figures

3,838,332

LINE CONNECTED SCR REGULATOR

BACKGROUND OF THE INVENTION

Low cost power supplies are much in demand in the 50 to 150 volt range, supplying on the order of ¼ to 1 ampere. The output voltage should be reasonably well regulated to avoid voltage changes caused by either a-c line or load variations. The voltage range suggests direct connection to the 120-volt (nominal) a-c power line. This avoids the cost of a power transformer and the inherent degradation of performance imposed by such a transformer. Since the actual voltage available ranges between 108 and 130 volts, some form of regulation is often essential. Conventional regulator circuits are effective but are costly. In addition, they tend to dissipate considerable power except at the lower input voltage levels. Silicon-controlled rectifiers (SCR's) have been proposed as controlled a-c line rectifiers and as series pass regulator elements. In a few circuits, the SCR acts as a rectifier and control element combined. A major problem exists in the use of an SCR because of its firing characteristics. Once an SCR is fired, by virtue of a pulse on its gate electrode, its impedence becomes very low and the gate electrode can no longer control conduction. In essence, the gate electrode can fire the SCR but cannot turn it off once conduction has started. Most regulator circuits require that some means be available for reducing conduction, as well as starting it. In thise circuits the SCR is not normally used and a more expensive device having the required characteristics, such as a thyrister, is used.

In a well known application, a solid state television deflection circuit requires a stable d-c voltage. Typically, this will be in the above-mentioned voltage and current ranges. Such a device will require a well regulated, low-cost reliable circuit that dissipates as little power as possible.

SUMMARY OF THE INVENTION

It is an object of the invention to employ an SCR in a power supply wherein it acts simultaneously as a line-connected half wave rectifier and a d-c output voltage control device.

It is a further object of the invention to employ an SCR as a combined rectifier-voltage regulator by controlling its firing angle to lag the a-c input by an angle that lies somewhere in the range of less than 90° and less than 180°.

It is a still further object of the invention to fire an SCR by means of a delayed pulse generator that is synchronized with the a-c input to the SCR to achieve a variable d-c output voltage. The d-c output voltage is regulated by using a d-c comparison circuit to control the SCR firing angle These and other objects are achieved in a circuit that operates in the following manner. An SCR is connected to an a-c line as a half-wave rectifier. The rectifier voltage output is filtered and compared with a fixed stable reference voltage. The difference voltage is used to control the time delay introduced by a delay circuit that is used to fire a bistable latching circuit. The latching circuit produces a pulse that fires the SCR. If the delay circuit is synchronized to the positive excursion of the a-c input, and the delay value adjusted to fall in the range between less than 90° and less that 180°, a strong regulator function is available.

In a preferred circuit embodiment a dual Miller integrator delay circuit is built into a latching circuit so that the functions of trigger generation and delay are combined.

DESCRIPTION OF THE INVENTION

Figures 1, 2, 4:
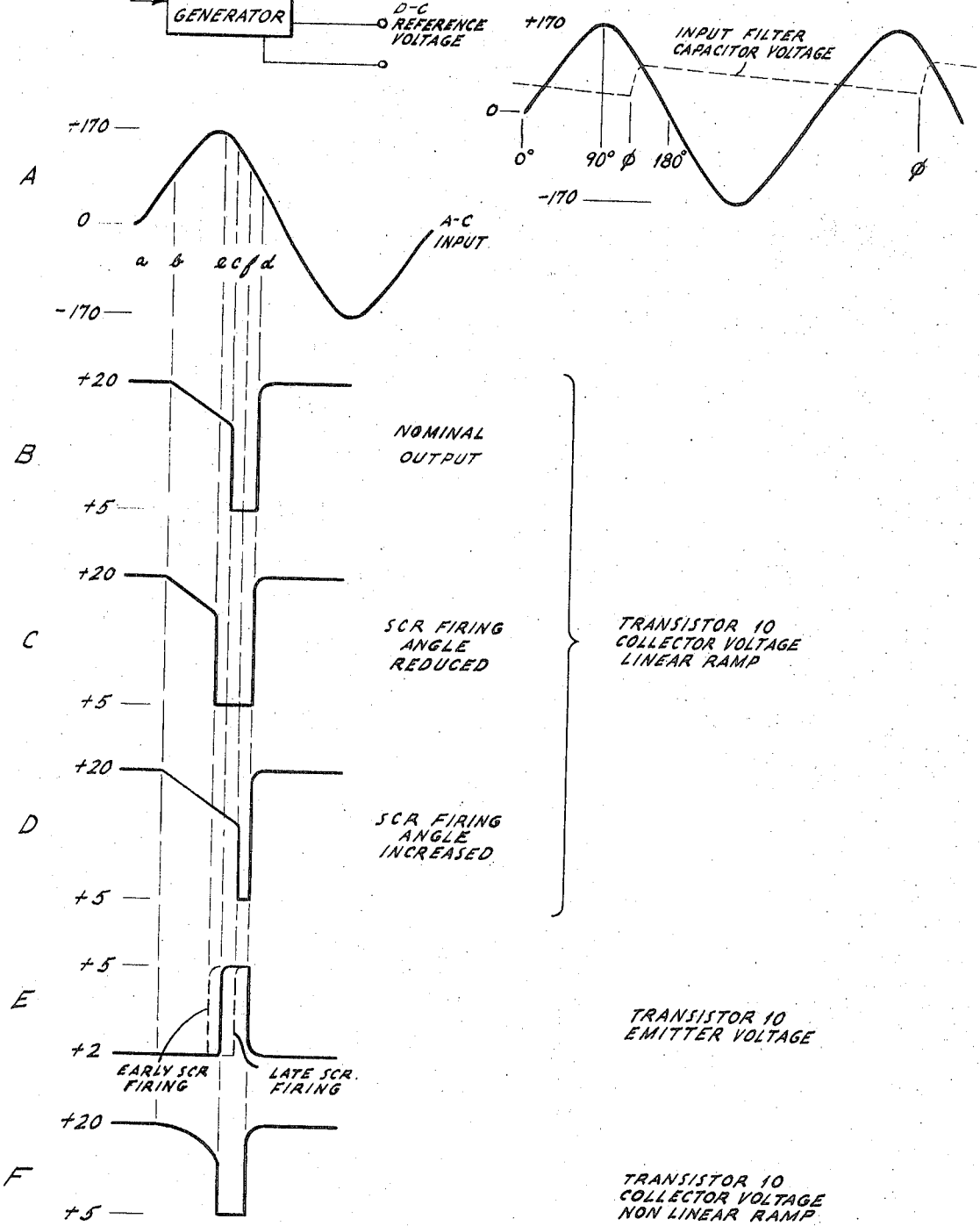
FIG. 1 is a partial block-schematic diagram showing the basic elements of the invention.
FIG. 2 is a graph showing the basic timing relationships of the elements of FIG. 1.
FIG. 4 is a composite showing of waveforms associated with various points in FIG. 3.

FIG. 1 shows the basic elements of the circuit of the invention. SCR 1 is directly connected in one side of the a-c line input where it will act as a half-wave rectifier. A conventional filter 2 smooths the rectifier output to provide a steady d-c output. If the circuit used a simple diode, or if the SCR gate electrode were returned through a suitable resistor to the anode, a conventional half-wave rectifier will result. In such a circuit the rectifier would turn on during the rise of the positive excursion of the a-c input voltage and would charge filter capacitor 4 to the peak a-c line voltage. The rectifier would turn off when the a-c input voltage drops to the cathode voltage level. The filter capacitor would discharge until the next positive a-c input excursion whereupon the cycle repeats. Clearly, the d-c output voltage would be a function of the peak input voltage.

By adding the pulse generator 3 to the circuit the SCR can be fired when desired by a controlled gate pulse. As shown in FIG. 2, the SCR is fired somewhere near the a-c input peak, the firing angle being designated $\phi$. $\phi$ will be located in the range of shortly ahead of the 90° and 180° points on the input waveform. This is because the maximum power supply energy capability will occur when the SCR is fired slightly ahead of the 90° point on the input wave and to have any output at all the SCR must be fired ahead of the 180° point. The dashed line shows the input filter capacitor 4 waveform. At $\phi$, when the SCR is fired by a pulse from generator 3, the capacitor will quickly charge along an exponential rise to whatever voltage is present at the SCR anode. Then the capacitor will discharge between positive input alternations until the next firing interval. It can be seen that the capacitor charge is no longer related to peak line voltage. In addition, the magnitude of charge can easily be controlled or varied by changing the firing angle $\phi$.

As shown in FIG. 1, the pulse generator is synchronized by connecting it to the a-c input. The generator supplies a pulse, delayed with respect to the a-c input, that will turn the SCR on in the range of less than 90° to less than 180°. The delay is made variable in response to the difference between the d-c output voltage and a fixed d-c reference voltage applied between the indicated terminals. If the d-c output voltage is too low, the delay is reduced so that the SCR fires sooner; this will locate the firing point closer to the a-c input peak. If the d-c output voltage is too high, the delay is increased so that the SCR fires later and, therefore, lower down on the a-c input waveform. By making the firing angle φ a strong function of d-c output, close control of the output voltage is obtained. Clearly, the circuit will compensate for input of power line variations as well as load variations.

Figure 3:
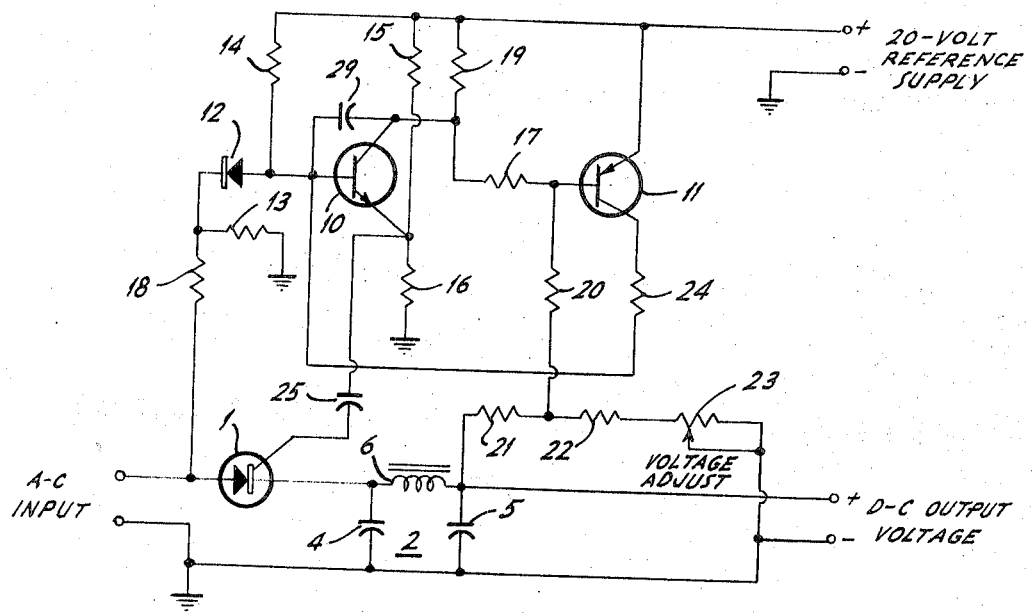
FIG. 3 is a schematic diagram of a circuit that will perform the functions of the invention.

FIG. 3 shows the essential element of an operating regulator circuit. SCR 1 is connected directly to the a-c input and provides rectified d-c output by way of filter 2 which is composed of input filter capacitor 4, output filter capacitor 5, and series filter inductor 6. Transistors 10 and 11 are connected into a well known bistable latching complementary pair configuration. Transistor 10, in addition to being part of a latching pair, also acts as a Miller effect delay device. When transistor 10 is turned on from its off state, it will come on slowly due to the Miller effect. After a delay period, its output will become sufficient to turn transistor 11 on and the complementary pair will then rapidly switch on to saturation. This latter turn on action provides a pulse that is coupled by way of coupling capacitor 25, to the SCR so as to fire it. Since the turn on of transistor 10 is synchronized to the a-c input, the SCR firing angle is then controlled by the duration of the Miller effect delay. The delay is in turn controlled by connecting a fraction of the d-c output voltage to the base of transistor 11 to act as a bias or threshold control. As the d-c output voltage varies, the threshold at which the complementary pair switches on will be varied. This action varies the duration of the Miller effect delay. The sense of this feed-back loop is such that the d-c output voltage will tend to remain nearly constant as will be discussed hereinafter.

A 20-volt reference supply is shown operating the delay and switching circuits. In applications where a suitable regulated voltage is available it would be used. If no such regulated voltage is available, the reference can be obtained from any convenient unregulated source that supplies more than the required value at the lowest a-c line voltage condition. A dropping resistor and zener diode having the required voltage rating are connected in series across the unregulated source. The voltage present across the zener diode is then used as the reference. If no such unregulated source is available an additional rectifier diode and filter capacitor combination can be connected to the a-c input line and the above-mentioned resistor-zener diode combination connected across the filter capacitor. These latter components, associated with the 20-volt reference supply, are conventional and are not shown in the drawing.

In the quiscent state when the a-c input is near zero, diode 12 is forward biased by electron flow due to the 20-volt reference supply. Electrons will flow from ground through resistor 13, from the cathode of diode 12 to its anode, and then up through resistor 14 to the positive supply terminal. Resistor 13 is made quite small, about 0.1 percent of the value of resistor 14, so that the drop across it is negligible. Diode 12 being forward biased will develop about 0.6 volt at the base of transistor 10. Resistors 15 and 16 are proportioned to apply a positive voltage of about 2 volts to the emitter of transistor 10. Thus, transistor 10 will not conduct until its base is more than about 2.7 volts positive. For these quiescent conditions transistor 10 will be cut off and its collector will rest at almost 20 volts. This will apply a high positive potential to the base of transistor 11 through resistor 17 and transistor 11 will be held in its off state. This is a stable state for both transistors.

Resistors 13 and 18 form a voltage divider across the a-c input and are proportioned to apply about 2 percent of the input to the cathode of diode 12. This will be about 3.4 peak volts for a 120-volt line condition. As the a-c input swings from zero toward its positive peak, at some point along the excursion, diode 12 will be cut off or reverse biased. When this occurs, the base voltage on transistor 10 will rise toward the positive 20-volt supply because of resistor 14. When this rise exceeds about 2.7 volts, transistor 10 will start to conduct and its collector will start to fall toward ground potential. However, as soon as the collector starts to fall, capacitor 29 will couple the fall back into the base and oppose the change. This circuit configuration is called a Miller-effect circuit. As far as the base of transistor 10 is concerned, the circuit behaves as if a large capacitor were connected between base and ground. This effective capacitor has a value approximately equal to the value of capacitor 29 multiplied by the circuit gain of transistor 10. Thus, a relatively small capacitor 29 will act in conjunction with resistor 14 to form a relatively long time constant integrator. In effect, a 0.02 microfarad capacitor can be made to act as if it were a 0.4 microfarad capacitor is the transistor circuit gain is only 20 an easily achieved value.

The action is shown graphically in FIG. 4. It should be noted that the voltages shown are approximate and are for guidance only. Waveform A represents the a-c input for a 120-volt line. The starting reference point is time a when the input is at zero and subsequently will go positive. The input rises until at time b diode 12 is cut off. As shown in waveform B the collector of transistor 10 will slowly fall in a linear manner due to the above described Miller-effect integrator action. This fall will continue until time c is reached.

It will be noted that the emitter of transistor 11 is returned to the 20-volt reference. Thus, when its base drops to about 19.3 volts it will begin to conduct. Resistors 17, 19, and 20 are selected, along with the values of voltage divider resistors 21, 22, and 23 so that transistor 11 will be well below cutoff when transistor 10 is cut off. As the collector voltage of transistor 10 falls, at some point the base of transistor 11 will reach the 19.3-volt level. When this occurs and transistor 11 starts to conduct, collector conduction will tend to drive the base of transistor 10 positive. This in turn lowers the collector voltage of transistor 10 so as to turn transistor 11 on even harder. This regenerative action terminates the Miller-effect ramp and both transistors are quickly driven into saturation. At this time the collector of transistor 10 will have dropped to about 5 volts as shown in waveform B. Ramp termination can occur rapidly because resistor 24 is made much smaller than resistor 14 which, in conjunction with the MIller-effect capacitance, established the ramp rate. In practice, the value of resistor 24 is made as about equal to the value of resistor 15 Thus, if resistors 15 and 16 produce a quiscent off state voltage of 2 volts at the emitter of transistor 10, the value will increase to about 5 volts in the saturation or on state.

Thus, when the complementary transistor pair switches on, a positive pulse will appear at the emitter of transistor 10, as shown by the solid line of waveform E of FIG. 4. This pulse will be coupled to the gate of SCR 1 by capacitor 25, thereby causing it to fire at time c. As the a-c input continues to fall, time d is reached at which point diode 12 becomes again forward biased and cuts off transistor 10. This, in turn, cuts off transistor 11 because the collector of transistor 10 quickly returns to its 20-volt level where it will remain until the above sequence is repeated on the next positive half of the a-c input cycle.

If, for some reason, such as an increased load, the d-c output voltage were to decrease, it can be seen that a less positive quiscent bias will appear at the base of transistor 11. This means that less ramp action is needed at the collector of transistor 10 to produce the level at which the complementary transistor pair switches on. This is shown in waveform C where switching occurs at time e. The early switching pulse at the emitter of transistor 10 is shown in waveform E as the left-hand dashed line. Since firing SCR 1 at time e will produce more d-c output voltage than firing at time c, the output voltage will be increased by the reduced firing angle to compensate for the postulated d-c output voltage reduction.

Conversely, if the d-c output voltage were to rise, for example as a result of reduced loading, a more positive bias will be applied to transistor 11. This means that the ramp on the collector of transistor 10 will have to run longer to cause switching. This is shown in waveform D where switching is delayed until time f. The emitter of transistor 10 shown in waveform E displays the increased firing angle in the form of the right hand dashed line portion. Since the SCR is now fired lower on the a-c input waveform, the d-c output voltage will be reduced to compensate for the postulated rise For a given set of component values the circuit will act to maintain nearly a constant d-c output voltage value. It will, in fact, act to maintain a nearly fixed difference between the d-c output voltage and the reference voltage. Thus, it is responsive to variations of a-c input as well as load variations.

As a matter of convenience, such regulators usually include an adjustable element because otherwise each part would have to be held to excessively strict tolerance. In the circuit of FIG. 3 resistor 23 is made variable. As this resistor is varied, a variable fraction of the d-c output voltage is supplied to the base of transistor 11. This will vary the length of the ramp needed to drive transistor 11 into conduction and will, therefore, vary the SCR 1 firing angle. For a given set of input conditions resistor 23 can vary the output voltage over a substantial range. The circuit will then act to maintain the d-c output voltage constant at nearly the set value Since transistors 10 and 11 are not required to handle large power values and since they are only on for a small fraction of the time, they dissipate very little power. SCR 1 too dissipates very little power because it is on for an even smaller fraction of the time. Furthermore, when the SCR is on and current is flowing, its voltage drop is very low, and while it is off, very little leakage current flows. Thus, the circuit acts as a well regulated power supply while dissipating very little energy. This means that heat sink requirements are minimized and even the SCR which must pass the full output current need not have a high power rating. This is to be contrasted with a conventional d-c power supply regulator which dissipates considerable energy and requires the use of high power devices and additional heat sinking.

Power dissipation can be quite important in small compact solid state products. Small size for a given dissipation means that more internal temperature rise must occur. This is quite adverse to life and reliability in solid state designs. Accordingly, the invention is especially appropriate in such items as solid state commercial television receivers, particularly those of compact design.

DESCRIPTION OF THE PREFERRED EMBODIMENT

Figure 5:
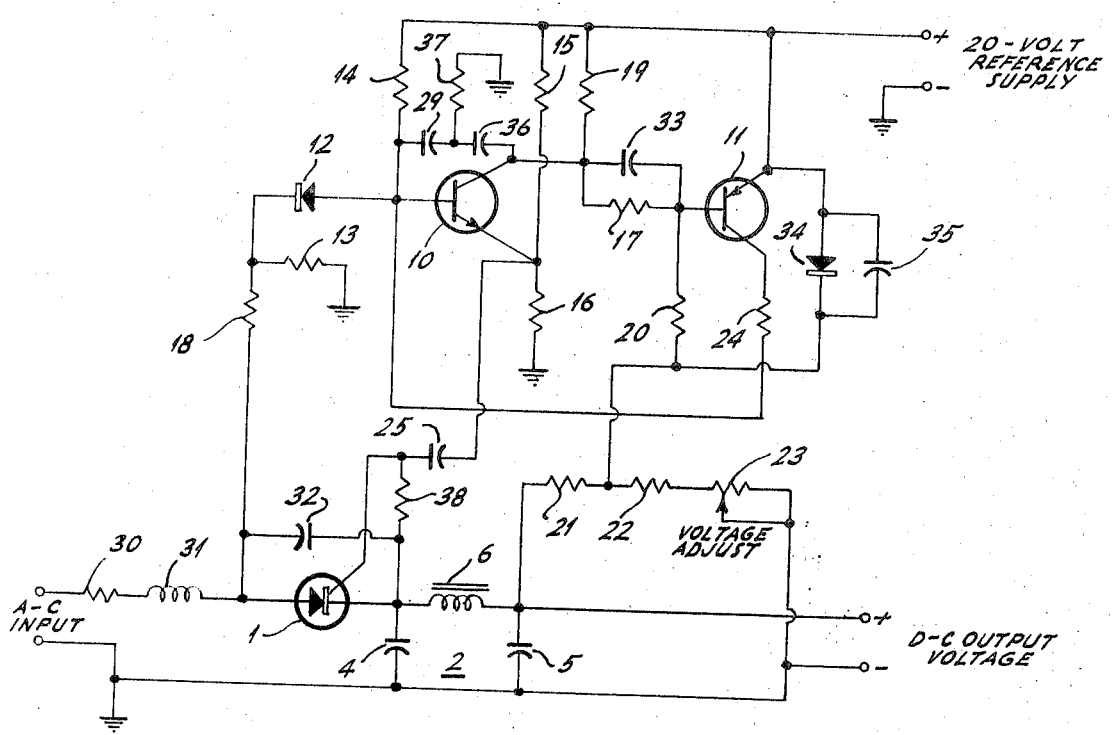
FIG. 5 is a complete schematic diagram of a circuit employing the invention and intended for use in a commercial television receiver.

FIG. 5 shows a complete schematic of a regulated power supply used to provide the energy required by the horizontal deflection circuit of a solid state television receiver. The circuit functions as the one shown in FIG. 3 except for certain modifications and additions that will now be described.

When an SCR is fired by a gate pulse, its forward impedance is extremely low. Since the internal impedance of an a-c power line can be quite low, extremely large currents can be triggered in a capacitor input filter type of power supply. For example, in a supply with a 0.5 ampere nominal drain such surges can approach values as high as 20 amperes. Inductor 31 and resistor 30 are included as surge arrestor components. Capacitor 32 is connected directly across the cathode-anode circuit of SCR 1 to act as a switching transient suppressor. Capacitor 33 is connected across resistor 17 and acts as a switching speed up or commutating capacitor. The gain of the complementary pair is enhanced by this capacitor during the switching transient interval and this provides for more reliable switching.

Diode 34, at the emitter of transistor 11, is present to ensure that transistor 11 will not saturate prior to transistor 10 going into conduction when the a-c input is first applied. This diode will prevent an undesirable latchup condition where transistor 11 would remain in saturation at all times. This could prevent the pulse circuit from operating and SCR 1 would never be fired. Hence no d-c output voltage would develop. The presence of diode 34 prevents the lower and of resistor 20 from going much below 20 volts thereby keeping transistor 11 from saturating. This means that the pulse generator can function in response to a-c power line synchronization by way of diode 12 and the SCR 1 will be triggered on. When the d-c output voltage is present diode 34 will normally be reverse biased and will have no effect on normal circuit operation. Capacitor 35, a large value capacitor connected in parallel with diode 34, acts as a gain damping element for the complete regulator. It controls the system gain versus frequency performance to avoid circuit instabilities that would be present if uncontrolled high frequency system gain were too great.

Capacitor 36 and resistor 37 convert the Miller delay circuit to a double Miller delay. By merely adding these two components the circuit acts as if the Miller delay circuit consisted of two delay elements in cascade. In effect, a double integrator action develops. For a single integrator the ramp described above and shown in FIG. 4 is linear. A close inspection of waveform A of FIG. 4 will reveal that near the peak of the sine wave a given change of firing angle in SCR 1 will product less change in output voltage than a similar change closer to the 180 degree point on the sine wave. Thus, system gain increases as the ramp duration is increased. Clearly, if capacitor 35 is selected for optimum damping at a particular gain value, the optimization will not hold for all SCR firing angles. By using a double integrator in the ramp generator, the ramp is no longer linear. A single integration of a step function yields a constant slope and a second integration yields a parabolic function. The slope of the ramp will be shallow at first, and will thereafter increase as shown in waveform F of FIG. 4. This means that the change in SCR firing angle as a function of voltage will be higher at first and then decrease. Thus, if the parabolic function is properly selected it will largely compensate for the change in system gain produced by the sine shape of the input waveform.

Resistor 38, connected between the cathode and gate of SCR 1, is included to insure that the SCR gate electrode nominally operates at source potential.

The circuit of FIG. 5 was constructed using the following components:

| | |
|---|---|
| SCR 1 | C107D1 (General Electric) |
| Capacitor 4 | 400 microfarad 175 volts |
| Capacitor 5 | 400 microfarads 150 volts |
| Inductor 6 | 0.2 henry |
| Transistor 10 | 2N4424 |
| Transistor 11 | 2N5366 |
| Diode 12 | 1N456 |
| Resistor 13 | 1 k ohms |
| Resistor 14 | 910 k ohms |
| Resistor 15 | 3.3 k ohms |
| Resistor 16 | 330 ohms |
| Resistor 17 | 82 k ohms |
| Resistor 18 | 47 k ohms |
| Resistor 19 | 6.8 k ohms |
| Resistor 20 | 18 k ohms |
| Resistor 21 | 160 k ohms |
| Resistor 22 | 33 k ohms |
| Resistor 23 | 15 k ohms |
| Resistor 24 | 3.3 k ohms |
| Capacitor 25 | .047 microfarad |
| Capacitor 29 | .022 microfarad |
| Resistor 30 | 2 ohms 15 watts |
| Inductor 31 | 1 m henry |
| Capacitor 32 | .01 microfarad |
| Diode 34 | 1N456 |
| Capacitor 35 | 4.7 microfarads |
| Capacitor 36 | 0.1 microfarads |
| Resistor 37 | 9.1 k ohms |
| Resistor 38 | 1 k ohms |

Using variable resistor 23, the d-c output voltage of the circuit of FIG. 5, using the above component values, was adjusted to a nominal 110 volts. The internal power supply impedance at 500 milliamperes was in the range of 1–2 ohms. The output varied less than 0.5 percent over an input voltage range of 108 to 132 volts. The damping factor was such that the system had a settling time of about 100 to 200 milliseconds.

The invention has been described in detail and a set of component values has been shown to provide suitable performance. It is clear that modifications could be made within the scope of the invention. It is intended that the invention be limited only by the following claims.

I claim:

1. A regulated voltage power supply comprising:
   means for connecting said power supply to a source of alternating current,
   an SCR connected to rectify alternating current supplied by said source to produce a direct current output voltage,
   a pulse generator for generating pulses whose phase is synchronized in relation to the phase of said alternating current source,
   variable delay means for delaying the phase of said pulses in relation to the phase of said alternating current source, said variable means operating between the limits of slightly less than 90° and slightly less than 180° of said alternating current of said source referenced to where said current passes through zero,
   means for applying said pulses to said SCR to control the time of firing thereof,
   means for applying a fixed direct current reference voltage to said pulse generator,
   means in said pulse generator for comparing said output voltage and said reference voltage, and for developing a difference signal representative of the difference in said voltages, and
   means in said pulse generator responsive to said difference signal and operative on said variable delay means to vary said delay, said variation in said delay adjusting the firing time of said SCR in a direction that will maintain said output voltage substantially constant.

2. The power supply of claim 1 wherein said pulse generator is operated from said reference voltage and a fraction of said output voltage is connected to said generator to provide said means for comparing 3. The power supply of claim 1 wherein said delay is produced by a Miller integrator synchronized by said alternating current source.

4. The power supply of claim 3 wherein said delay is achieved by a two stage Miller integrator with the time constant being selected to provide substantially constant regulator gain over the useful range of SCR firing time.

5. The power supply of claim 3 wherein said Miller integrator is combined with a trigger pulse circuit operative to terminate said delay.

6. The power supply of claim 5 wherein said trigger pulse circuit comprises a complementary pair of transistors connected in latching configuration.

* * * * *